April 9, 1968　　　Z. D. FARKAS　　　3,377,541
VOLTAGE MULTIPLYING INVERTER/CONVERTER SYSTEM
Filed March 7, 1966　　　　　　　　　　　2 Sheets-Sheet 1

PRIOR ART FIG. 2B

INVENTOR.
ZOLTAN D. FARKAS
BY Townsend and Townsend
ATTORNEYS

United States Patent Office 3,377,541
Patented Apr. 9, 1968

3,377,541
VOLTAGE MULTIPLYING INVERTER/ CONVERTER SYSTEM
Zoltan D. Farkas, 2053 Princeton St., Palo Alto, Calif. 94306
Filed Mar. 7, 1966, Ser. No. 532,437
2 Claims. (Cl. 321—15)

The present invention is directed to a high voltage generating apparatus and more particularly to a circuit for generating high voltage AC current with a lower voltage DC source.

Broadly stated, the present invention to be described in greater detail below is directed to a high voltage generating apparatus including a DC power supply in series with a unidirectionally conducting element that allows current flow out of, and prevents current flow into the positive terminal of the DC power supply, a DPDT switch, and a series RLC circuit means for connecting the source of unidirectional current first across the RLC circuit in one direction and then across the RLC circuit in the opposite direction with provision for repeating this operation.

This circuit permits the generating of high alternating voltage wave from a low voltage DC source with a voltage gain equal to the voltage gain of a series RLC circuit tuned to resonance, at all chopping frequencies below the resonant frequency of the RLC circuit. The circuit permits generation of wave forms consisting of an arbitrary sequence of alternating positive and negative half period sine wave current pulses through the RLC circuit and half period cosine voltage wave pulses across L and across C. At the end of the pulse the voltage across L drops to zero and remains zero until the next pulse, while the voltage across C essentially retains the peak reached at the end of the pulse, until the next pulse.

Another advantage of this invention lies in the fact that the voltage gain in the circuit with continued switching of the unidirectional DC source is essentially constant independent of the period between reversal of the connection to the unidirectional current, DC source, subject only to the limitation that the energy loss between pulses be much less than the energy loss during the pulse.

The various practical applications of this circuit include voltage multiplication, magnetic field pulser, and a counting device.

Other features and advantages of the present invention will become more apparent upon a perusal of the following specification taken in conjunction with the accompanying drawing wherein:

FIGS. 1, 2A and 2B are schematic circuit diagrams partially in block diagram form of certain prior art circuits;

As will be described in greater detail below, the RLC circuit driven in accordance with the present invention is useful for generating a transient high magnetic field such as, for example, used to control the trajectory of charged particles. In such application there may be considerable time between pulses permitting economization of certain factors in the circuit.

One circuit utilized to control high magnetic field is described by W. F. Westendorp, Journal of Applied Physics, volume 16, page 657 (1945) and is made up of a battery effectively connected in series with an AC source to a parallel resonant circuit. This circuit basically superimposes a DC bias and AC in a tuned resonant circuit. However, in this circuit the AC source must be tuned to the resonant frequency of the RLC circuit.

Figure 1:
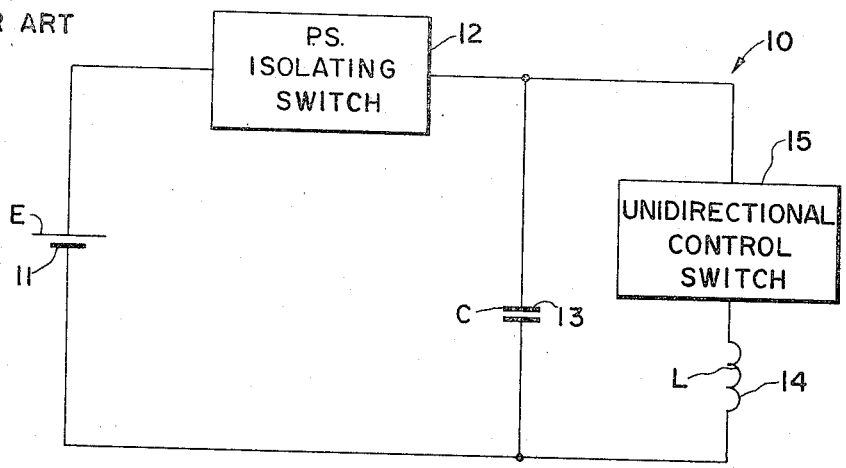

FIG. 1 illustrates a prior art LC circuit which is also useful for controlling high magnetic fields and which does not require a tuned AC source. This circuit utilizes a single half period oscillation with an arbitrary tune interval in between oscillations. However, in this circuit, although the energy source supplies only the inevitable loss, the source voltage must be high.

In the circuit 10 in FIG. 1 a capacitor 13 is connected in parallel with an inductor 14 isolated by a unidirectional control switch 15 and the parallel capacitor 13 and inductor 14 are connected to a DC source 11 via a power supply isolating switch 12. In this circuit the capacitor is both discharged and recharged through the inductor and the loss of charge during the operating half cycle is replenished by the source 11. This system is "equivalent" to a parallel resonant circuit in that it has a current gain, i.e. the peak current through the power supply is considerably less than the oscillating current. There is no step-by-step increase in voltage and there is no voltage gain.

Figure 2A:
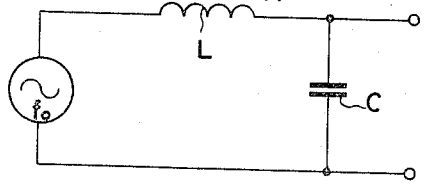
Figure 2A:
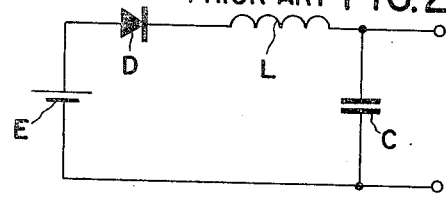

Resonant charging both AC, and direct current with a diode, are used extensively in "line type" radar modulators in a configuration similar to the configurations shown in FIGS. 2A and 2B, respectively. The disadvantage of AC resonant charging is the specific relationship between repetition period, storage capacitance and charging inductance that must be maintained. Thus, as in FIG. 2A, $f_0$ must be equal to $$2\pi \frac{1}{\sqrt{LC}}$$

A disadvantage of DC resonant charging with a diode D as shown in FIG. 2B is that the maximum possible voltage multiplication is a factor of two. The present invention makes it possible to multiply the charging voltage by a much higher factor than two without maintaining a specific relationship between the repetition period and the values of the charging capacitance and inductance.

Figure 3:
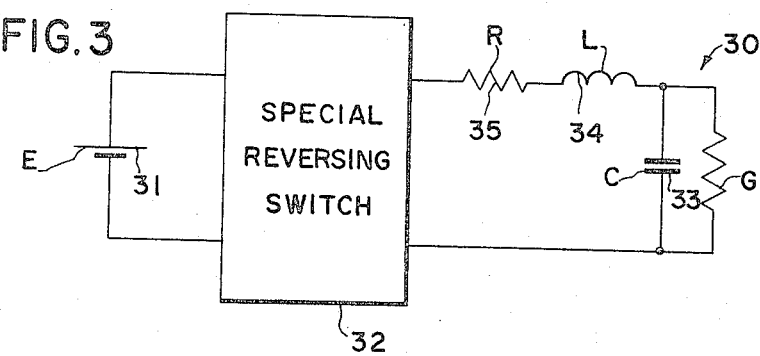
FIG. 3 is a schematic circuit diagram partially in block diagram form of a circuit in accordance with the present invention.

The present invention which is directed to a circuit for generating high voltage is illustrtaed in FIG. 3 and includes a source of DC voltage applied to a series resonant circuit 30 including a capacitor 33, an inductor 34 and a resistor 35 via a special reversing switch 32. A load can be in the form of a low conductance G across the capacitor 33. The special reversing switch 32 permits current through the battery in one direction only, such that the battery can only deliver but cannot even instantaneously receive power from the external circuit. Since the current is unidirectional, the current through series resonant circuit 30 in either direction lasts only for a half period of the damped resonant frequency of the series resonant circuit 30. After the end of such half period, the capacitor will remain charged. At the end of an arbitrary length of time after the end of the half period, the switch 32 is actuated to reverse the connection of the circuit 30 terminals for directing current through the circuit 30 in the opposite direction from that of the previous pulse. As long as source is connected to the circuit for at least one half period of the damped resonant frequency of the series resonant circuit 30, the process can be repeated indefinitely.

Figure 5:
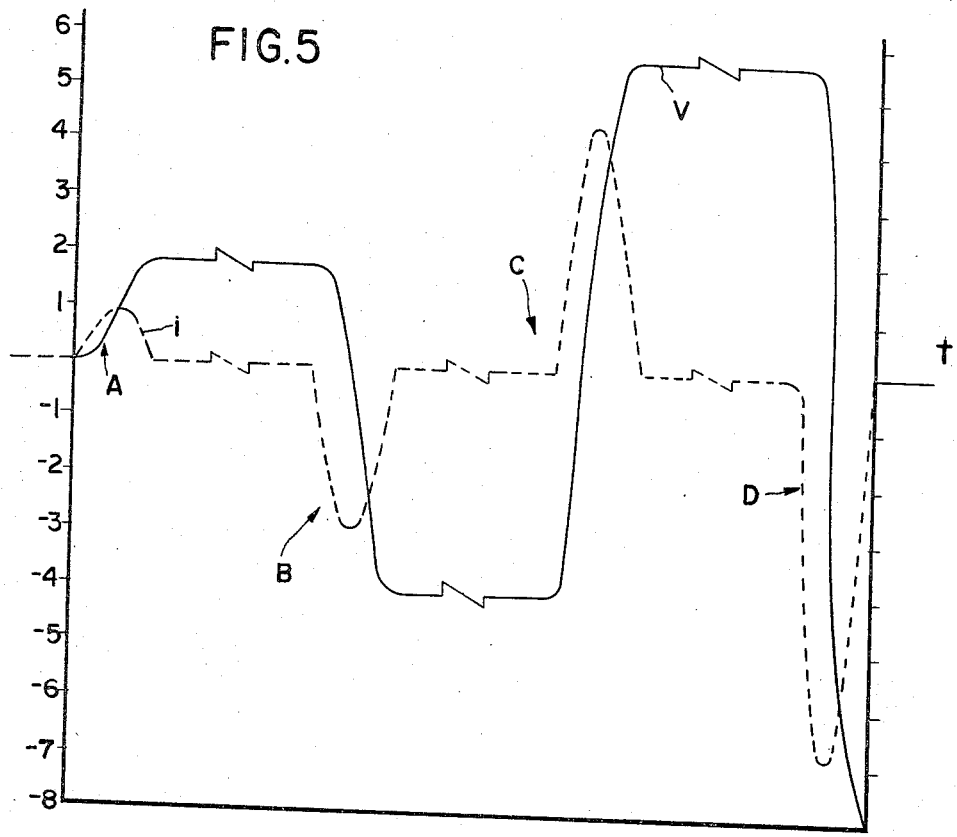
FIG. 5 is a graph partially foreshortened illustrating a plot of the ideal voltage and current build up across the capacitance in the circuits illustrated in FIGS. 3 and 4.
Figure 6:
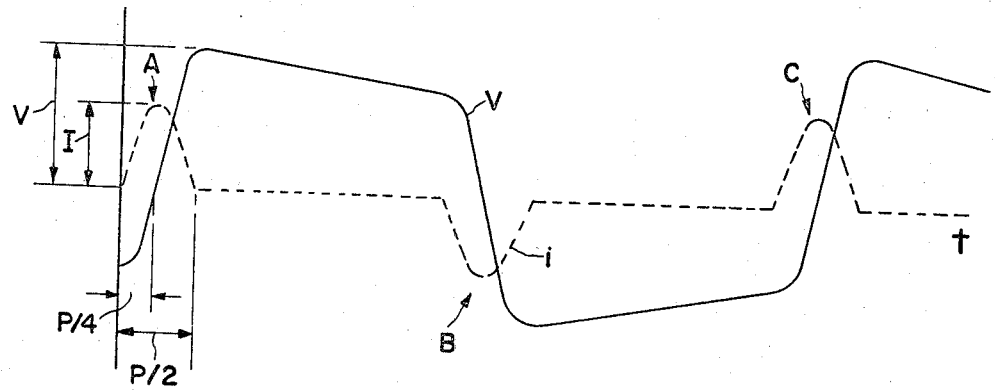
FIG. 6 is a plot of steady state voltage and current wave forms for a circuit in accordance with the present invention after a large number of operative cycles.

FIG. 5 illustrates the plot of the ideal voltage V and current I build up across the capacitor 33 with the respective curves foreshortened between each of the successive pulses A, B, C and D illustrated. As can be seen, during the first half cycle or during pulse A, the voltage across the capacitor C builds up to some value. During the next half cycle or during pulse B, the voltage applied to the circuit from source 31 via reversing switch 32 is reversed so that it is in series adding with the capacitor voltage so that the current is increased causing the capacitor to charge to a higher value during the half cycle. The voltage across the capacitor 33 causes an increase in current which in turn causes still more voltage across the capacitor. Thus the energy delivered to the capacitor increases with each successive oscillation. This is necessary since the capacitor energy difference between the beginning and end of each half cycle is proportional to the difference between the squares of the final and of the initial voltages, and since the difference between the voltages is always a constant, the difference between the squares increases as the voltage increases. As the reversing current and voltage process continues through pulses C, D, etc., both the energy delivered by the source to the oscillating circuit and the energy loss increase so that build up continues until energy delivered by the source is equal to the energy loss. The source voltage and current are always in phase so that there is no reduction in energy delivered by the source due to a phase difference between voltage and current as occurs in a conventional series resonant circuit, off resonance. FIG. 6 illustrates the steady state power supply current and capacitor voltage wave forms.

Denote the half period by T/2′ and the time in between battery current pulses, when the only current is the charge leaking of C through G, by $\tau$. Taking the capacitor voltage $V_n$ at the end of half period of current, decreased by a factor exp.

$$\left(\frac{-G\tau}{C}\right)$$

as the initial condition for the next current pulse yields the interation $$V_n = E\left[1 + \left\{1 + \exp.\left(\frac{-G\tau}{C}\right)\middle|V_n - 1\right|\right\}\exp.\left(\frac{-RT}{4L}\right)$$

This yields the general expression for the capacitor voltage at the end of the $n$th half period as $$V_n = \frac{\left\{1 + \exp.\left(\frac{RT}{4L}\right)\right\}\left\{1 - \exp.\left[-n\left(\frac{RT}{4L} + \frac{G\tau}{C}\right)\right]\right\}E}{1 - \exp. - \left(\frac{RT}{4L} + \frac{G\tau}{C}\right)}$$

As "$n$" increases the voltage gain approaches a maximum value of $$\frac{V\ \text{max.}}{E} = \frac{1 + \exp. -\left(\frac{RT}{4L}\right)}{1 - \exp. -\left(\frac{RT}{4L} + \frac{G\tau}{C}\right)}$$

It is apparent that for $$\frac{GT}{C} \ll \frac{RT}{4L}$$

the maximum gain is essentially independent of the fundamental frequency of the capacitor voltage waveform. For $$\frac{RT}{4L} \ll 1,\ \frac{RT}{4L} \approx \frac{4}{\pi}Q$$

and the voltage gain is approximately $$\frac{4}{\pi}Q$$

It is apparent from the above that series resonance type behavior is achieved at all frequencies below the resonant frequency of the RLC circuit.

The voltage gain of the circuit is constant, and independent of pulse spacing as long as the shunt loss across the capacitor during "open circuit" is much less than the loss in the resistor during oscillation. When the losses in the conductance across the capacitor are large compared to the losses in the resistance, then the voltage gain for small losses is a linear function of the pulse repetition rate.

Figure 4:
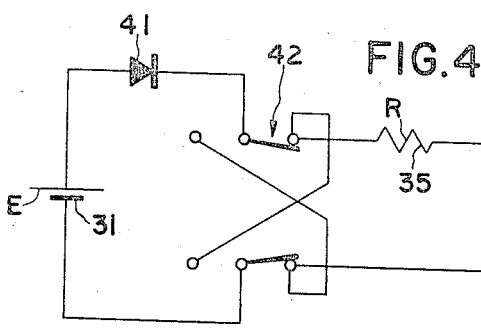
FIG. 4 is a schematic circuit diagram of a specific circuit in accordance with the present invention.

In one specific embodiment of the present invention illustrated in FIG. 4, the generation of the unidirectional current for application to the series resonant circuit 30 is accomplished via a diode 41 connected in series with the source 31 and this circuit connected to a double pole double throw switch 42 with the poles of the switch 42 arranged for connecting the unidirectional current from the diode 41 first through the series RLC circuit 30 in one direction and then after at least one half period of the damped resonant frequency of the circuit 31 through the circuit 31 in the opposite direction. The diode 41 insures that after the switch 42 has been thrown in either direction current will flow only for one half period of the damped resonant frequency of the circuit 30 and will maintain the peak voltage across C until the next throw of the switch.

The double pole double throw switch 42 can be operated manually or can consist of any of a number of equivalent devices such as vacuum tubes, transistors, relays, SCR's, etc. Therefore, the use of the terms "double pole double throw switch" and "double pole double throw means" are utilized herein and in the claims as including such other equivalent circuits or elements.

Among the uses for the circuit in accordance with the present invention is a magnetic field pulser for switching a maximum peak energy in a minimum time and minimum incidental loss such as, for example, the magnetic control of the trajectory of a traveling pulse of atomic particles. Another application would be for pulsing microwave ferrite devices. For such applications, a DC electromagnet can easily be converted to a pulsed magnet by the addition of the switching system in accordance with the present invention since the DC current and peak current are approximately the same.

In another application for the present invention it is possible to generate a voltage with a DC component across the capacitor by having consecutive long and short intervals between the pulses applied to the circuit. If the higher frequencies are filtered out, the result is a pure DC so that a DC voltage can be controlled by controlling the relative length of the two time intervals. Also, if the voltage of the source is modulated by a slowly varying voltage, the capacitor voltage will follow and amplify this change resulting in a possible application of this invention as an audio amplifier.

In another application for this invention a charging choke can be utilized with the diode and a DPDT switch to greatly increase the pulse forming line voltage.

Additionally, the circuit in accordance with the present invention can be utilized for counting with the voltage across the capacitor in the series resonance circuit used to indicate the number of pulses that have been applied. If the circuit parameters are chosen so as to obtain a high Q and a high resonant frequency, then the voltage across C, for a great number of initial pulses, increases by a discrete increment of 2E after each pulse.

As still another use for the present invention, with an audio signal in series with the DC source and with a pulse repetition rate much greater than the audio signal frequency, the circuit can be used as an audio modulator.

Although the above description is sufficiently specific to enable a person skilled in the art to practice the present invention, the following illustrative example of a manually operated circuit constructed in accordance with FIG. 4 is given along with the indicated voltage generated at each indicated flip of the switch 42.

Table I

| Element No. | Component Name and/or Trade Designation | Value of Parameters |
|---|---|---|
| 31 | Trygon HR40 PS | 4.4 v. |
| 33 | Capacitor (Sangamo) | 30 μf. |
| 34 | Inductor (surplus) | 100 mh. |
| 35 | Resistor (coil resistance) | 13 Ω. |
| G | Conductance | $10^{-6}$ mhos. |
| 41 | Diode SC2 | |
| 42 | DPDT Switch (C & H) | |

Table II

| Number of flips of switch: | Voltage produced |
|---|---|
| 1 | 8 |
| 2 | 14 |
| 3 | 16 |
| 4 | 18 |
| 5 | 20 |
| 6 | 20 |

The above experiment confirms that reasonance voltage multiplication can be obtained even at manual switching rates which is on the order of one switch per second even though the resonant frequency of the experimental circuit is 100 cycles per second.

Another experiment was performed using SCR as switching elements. The valve of the capacitor was changed .41 μf. A voltage gain of 40 was obtained over a (fundamental) frequency range of 500 cycles per second to 1 cycle per second.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A high voltage generating apparatus comprising, in combination: a source of unidirectional current; a resonant circuit including a resistor, a capacitor and an inductor connected in series, said circuit having a damped resonance frequency with a given one half cycle period and a double pole double throw means for connecting said source of unidirectional current first across said circuit to direct current in said circuit in one direction for said given period and then after an arbitary time interval across said circuit to direct current in said circuit in a direction opposite to said one direction for said given period whereby high voltage can be built up across the capacitor in said circuit in discrete steps each time the current in said circuit is reversed, ultimately reaching a limiting value which is greater than the voltage of the unidirectional current source by a large factor.

2. The apparatus in accordance with claim 1 characterized further in that said source of unidirectional current includes a source of DC current and voltage, a diode, means connecting said DC source to said diode, and an output from said diode whereby unidirectional current flows in said output from said diode with the DC source and diode connected across said series resonant circuit via said switch whereby series resonance voltage gain is obtained at all switching rates below twice the resonance frequency of said resonant circuit.

References Cited

UNITED STATES PATENTS

| 2,239,786 | 4/1941 | Jones | 307—150 |
| 2,889,470 | 6/1959 | Gray et al. | 307—108 |
| 3,292,073 | 12/1966 | Jones et al. | 321—15 |

JOHN F. COUCH, *Primary Examiner.*

W. E. RAY, *Examiner.*